(12) United States Patent
Bai et al.

(10) Patent No.: US 11,721,850 B2
(45) Date of Patent: Aug. 8, 2023

(54) DIRECT RECYCLING OF LITHIUM-ION BATTERY SCRAPS FOR MANUFACTURING A NEW ANODE

(71) Applicant: UT-Battelle, LLC, Oak Ridge, TN (US)

(72) Inventors: Yaocai Bai, Oak Ridge, TN (US); Ilias Belharouak, Oak Ridge, TN (US); Rachid Essehli, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 233 days.

(21) Appl. No.: 17/386,660

(22) Filed: Jul. 28, 2021

(65) Prior Publication Data
US 2023/0033430 A1    Feb. 2, 2023

(51) Int. Cl.
| | | |
|---|---|---|
| *H01M 10/54* | (2006.01) |
| *H01M 10/0525* | (2010.01) |
| *H01M 10/623* | (2014.01) |
| *H01M 4/62* | (2006.01) |
| *H01M 4/583* | (2010.01) |
| *H01M 4/66* | (2006.01) |
| *H01M 4/133* | (2010.01) |

(52) U.S. Cl.
CPC ........... *H01M 10/54* (2013.01); *H01M 4/133* (2013.01); *H01M 4/583* (2013.01); *H01M 4/623* (2013.01); *H01M 4/662* (2013.01); *H01M 10/0525* (2013.01)

(58) Field of Classification Search
CPC ...... H01M 10/54; H01M 4/133; H01M 4/583; H01M 4/623; H01M 4/662; H01M 10/0525
See application file for complete search history.

(56) References Cited

U.S. PATENT DOCUMENTS 10,205,200 B2 *   2/2019   Ho ............... H01M 10/54
10,727,547 B2 *   7/2020   Ho ............... H01M 10/54
(Continued)

FOREIGN PATENT DOCUMENTS

CN    110885072       *  3/2020
WO    WO2018006687    *  1/2018

OTHER PUBLICATIONS

CN110885072MT (Year: 2019).*
(Continued)

*Primary Examiner* — Alexander Usyatinsky
(74) *Attorney, Agent, or Firm* — Warner Norcross + Judd LLP

(57) ABSTRACT

An improved method of recycling lithium-ion battery anode scraps is provided. The method involves isolating an anode scrap including a graphite anode film adhered to a current collector foil with a polyvinylidene fluoride binder. The anode scrap is combined with deionized water to form a first mixture. The graphite anode film is delaminated from the current collector foil to form a second mixture comprising a free collector foil and a free graphite anode film. The free graphite anode film is filtered and dried from the second mixture to recover the free graphite anode film. The free graphite anode film is combined with a solvent comprising N-methyl-2-pyrrolidone (NMP) to form an anode formation slurry. The slurry is coated onto a copper current collector to produce a new anode.

12 Claims, 2 Drawing Sheets

(56) References Cited

U.S. PATENT DOCUMENTS

| | | | |
|---|---|---|---|
| 2014/0227153 A1* | 8/2014 | Laucournet | C22B 26/12 423/141 |
| 2014/0264185 A1* | 9/2014 | Kim | H01M 4/5825 423/140 |
| 2018/0013181 A1* | 1/2018 | Ho | H01M 6/52 |
| 2019/0089025 A1* | 3/2019 | Ho | H01M 10/0525 |

OTHER PUBLICATIONS

J Moradi et al., Journal of Applied Electrochemistry, 46, 123-148 (2016) (Year: 2016).*

Yi et al., Journal of Cleaner Production 277 (2020) 123585 (Year: 2020).*

He et al. Journal of Cleaner Production 143 ,2017, 319_325 (Year: 2017).*

Wang, H. et al., "Reclaiming graphite from spent lithium ion batteries ecologically and economically", Electrochimica Acta 313 (2019), pp. 423-431.

* cited by examiner

DIRECT RECYCLING OF LITHIUM-ION BATTERY SCRAPS FOR MANUFACTURING A NEW ANODE

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to the direct recycling of lithium-ion battery anode scraps for new anode manufacturing.

BACKGROUND OF THE INVENTION

Developing new technologies for recycling lithium-ion batteries is an urgent task because of their widespread use in electronics and electric vehicles. Direct recycling offers greater advantages as a recycling strategy when compared with pyrometallurgy and hydrometallurgy routes and minimizes energy use and waste by eliminating mining and processing steps. During the production process of lithium-ion batteries, large volumes of anode scraps including electrode trimmings and off-specification product are generated. Significant reductions in production costs can be realized by recovering critical materials like graphite and copper from scrap and reintegrating them into the production line so long as doing so does not involve a complete overhaul of the existing manufacturing infrastructure. Traditional recycling methods for anode scraps involve calcination in air to remove an organic binder that adheres graphite anode material to a copper current collector. Unfortunately, the calcination process is energetically expensive and produces toxic gases, for example hydrogen fluoride. Moreover, the calcination process destroys the organic binder. Therefore, it is desirable to develop an energy-efficient, scalable, cost-effective, and sustainable recovery process to recycle and reuse anode scraps generated from the lithium-ion battery production process.

SUMMARY OF THE INVENTION

An improved method of recycling lithium-ion battery anode scraps is provided. The method involves separating anode films from their current collector and re-manufacturing the recycled anode films into new anode. The anode scrap typically comprises a graphite anode film adhered to a current collector foil with a polyvinylidene fluoride (PVDF) binder. The anode scrap is combined with deionized water to form a first mixture. The graphite anode film is delaminated from the current collector foil to form a second mixture comprising a free current collector foil and a free graphite anode film. The free graphite anode film is filtered and dried from the second mixture to recover the free graphite anode film. The free graphite anode film is combined with a solvent comprising N-methyl-2-pyrrolidone (NMP) to form an anode formation slurry. The slurry is then coated onto a copper current collector to produce a new anode.

In this and other embodiments, the current collector foil comprises, alternatively consists of, copper. The method can further include the step of using the anode formation slurry in the manufacture of a new anode. The method can also include the step of shredding the anode scrap into a collection of smaller anode fragments before the deionized water is combined with the anode fragment to form the first mixture. The method can also include the step of modulating a temperature of the first mixture. In some embodiments, the method further includes milling the free graphite anode film and free collector foil. In certain embodiments, the method further includes sieving the free graphite anode film and free collector foil.

In specific embodiments, the first mixture consists essentially of, alternatively consists of, deionized water and the anode fragment with no solvent other than deionized water. The method is optionally performed at room temperature, but in some instances the method is performed at a temperature range of from 15 to 100 degrees Celsius. Generally, the step of delaminating the graphite anode film from the current collector foil occurs in less than 10 minutes, however, in certain embodiments the step of delaminating can occur in up to 30 minutes.

These and other features of the invention will be more fully understood and appreciated by reference to the description of the embodiments and the drawings.

DETAILED DESCRIPTION OF THE CURRENT EMBODIMENT

Figure 1:
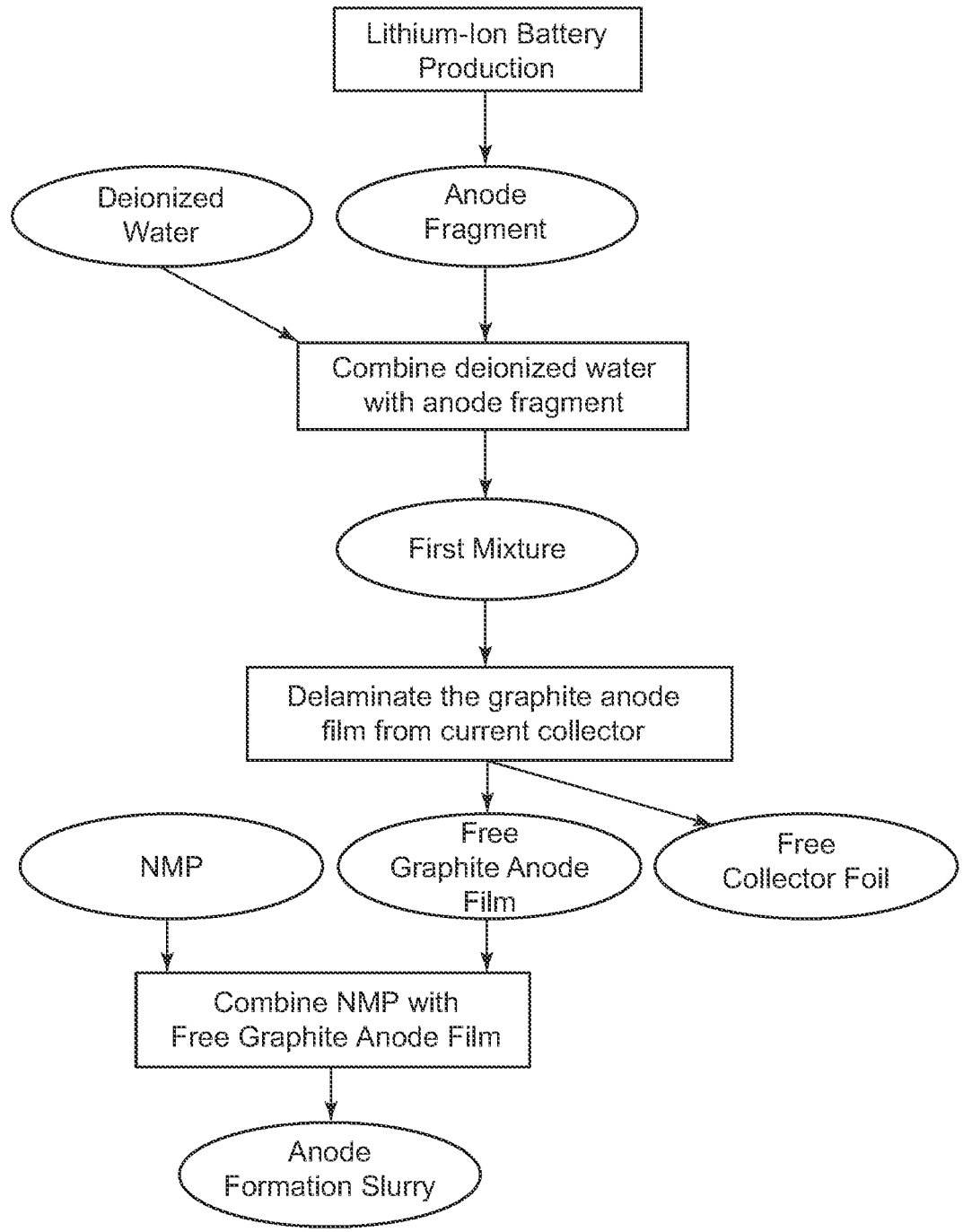
FIG. 1 is a flow chart illustrating a method for the recycling of lithium-ion battery anode scraps.
Figure 2:
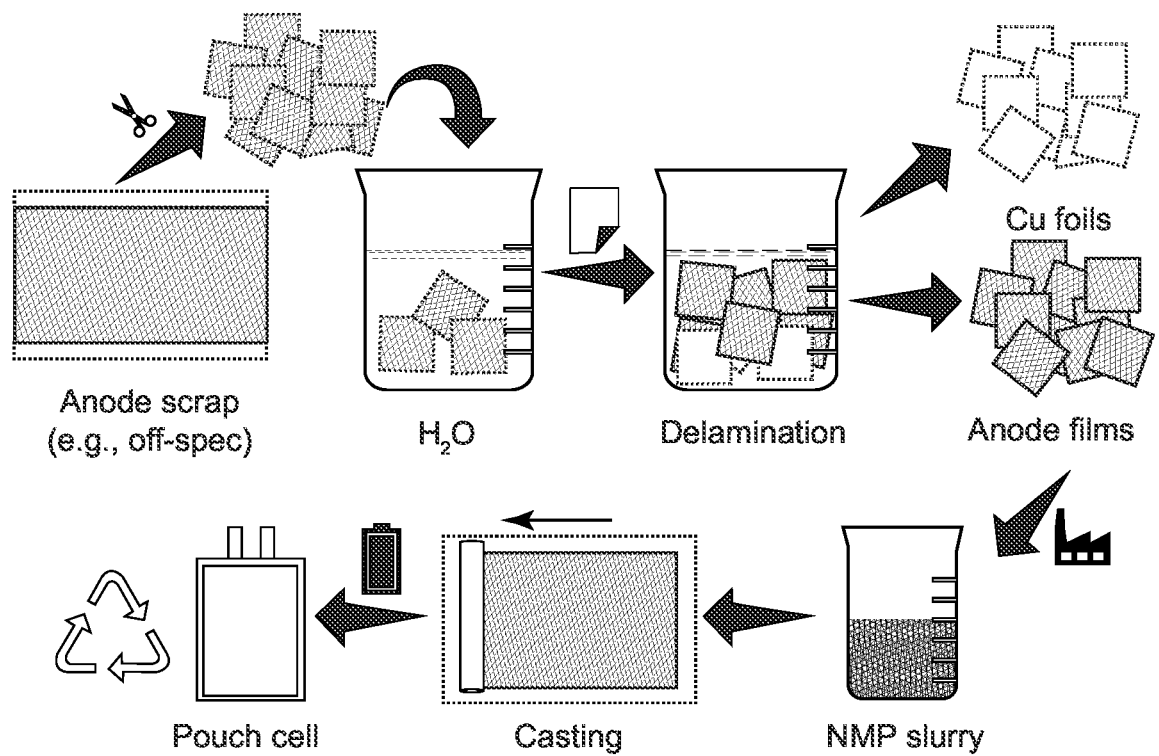
FIG. 2 is a graphical depiction of the method for the recycling of lithium-ion battery anode scraps.

As discussed herein, the current embodiment generally relates to a method of recycling lithium-ion battery anodes. The method generally includes the contacting of an anode fragment with deionized water to recycle anode scraps, typically those rejected during the course of lithium-ion battery manufacturing. Each operation is discussed below.

The method of recycling lithium-ion battery anodes includes a step of isolating an anode fragment. In specific embodiments, the step of isolating an anode scrap is a first step of the method that precedes all other steps. Lithium-ion batteries are generally produced via a lithium-ion battery manufacturing process. In the course of the lithium-ion battery manufacturing process, anode scraps are typically generated from various coatings, trimmings, and other material rejections. Once generated, the anode scraps are collected. In some embodiments, the anode scraps are cleaned and/or isolated from waste produced by the lithium-ion battery manufacturing process.

Generally, the anode scrap comprises an anode film adhered to a current collector with a binder. In some applications, the anode film comprises silicon or carbon. In other applications, the anode film is a graphite anode film. Typically, the current collector is a current collector foil. Generally, the current collector comprises a metal such as silver, copper, aluminum, zinc, nickel, cobalt, tin, or combinations thereof. In specific embodiments, the current collector comprises copper. Typically, the anode film is adhered to a current collector with a binder. In some applications the binder includes a Styrene-Butadiene Rubber (SBR) binder. In other applications, the binder includes a polyvinylidene fluoride (PVDF) binder.

In some embodiments, the method of recycling lithium-ion battery anodes further includes the step of shredding the anode scrap into a collection of smaller anode fragments. The step of shredding the anode fragments occurs before the step of combining deionized water with the anode fragment to form a first mixture. In some embodiments, the anode scrap is shredded into smaller anode fragments of about 1 cm². An industrial shredder for shredding lithium-ion battery anodes can include the Model 600E dual rotor shear shredder from SSI Shredding Systems of Wilsonville, Oreg.

The method of recycling lithium-ion battery anodes generally comprises a step of combining deionized water with the anode fragments to form a first mixture. Generally, the anode fragments are submerged in deionized water. In particular embodiments, the step of combining deionized water with the anode fragments occurs after the step of isolating the anode fragments. In some such embodiments, the step of combining deionized water with the anode fragments is the second step. Typically, the first mixture consists of deionized water and the anode fragments such that there are no other solvents except deionized water. In certain embodiments, the method of recycling further comprises modulating a temperature of the first mixture. In certain embodiments, the method is performed at 15 to 100 degrees Celsius. In specific embodiments, the method is performed at room temperature.

The method of recycling lithium-ion battery anodes comprises the step of delaminating the graphite anode film from the current collector foil to form a second mixture comprising a free current collector foil and a free graphite anode film. In the second mixture the free current collector foil and free graphite anode film are configured such that they are not adhered or affixed to each other. In some embodiments, the current collector foil is mechanically peeled from the graphite anode film. In alternative embodiments, the graphite anode film and the current collector foil delaminate in the deionized water without mechanical stimulation. In certain embodiments, the first mixture is agitated such that the graphite anode and current collector foil delaminate in the deionized water. Generally, the step of delaminating the graphite anode film from the current collector foil occurs after combining the anode fragment with deionized water. In some such embodiments, the step of delaminating the graphite anode from the current collector is the third step. In some embodiments, the step of delaminating the graphite anode film from the current collector foil occurs in under 30 minutes, alternatively under 10 minutes. The step of combining the deionized water with the anode fragment occurs before delaminating the graphite anode film from the current collector foil.

The method generally comprises the step of filtering and drying the free graphite anode film from the second mixture to recover the free graphite anode film. The filtering of the free graphite anode film from the second mixture typically uses a filter. The drying of the second mixture can include an industrial dryer and/or heater to evaporate the deionized water of the second mixture. In particular embodiments, the second mixture is dried through evaporation without the aid of any drying and/or heating equipment. In particular embodiments, the second mixture is dried before it is filtered. Typically, however, the second mixture is filtered before it is dried. In some embodiments, the step of filtering and drying the free graphite anode film from the second mixture occurs after the step of delaminating the graphite anode film from the current collector foil. In some such embodiments, the step of filtering and drying the free graphite anode film is the fourth step.

In some embodiments, the method further comprises the step of milling the free graphite anode film and free current collector foil. Generally, the step of milling the free graphite anode film and the free current collector foil is performed after the second mixture is filtered and dried. The objective of the milling step is to further reduce the size of the free graphite anode film, typically in preparation for a step of sieving the free graphite anode film and the free current collector foil. In certain embodiments, the method further comprises the step of sieving the free graphite anode film and the free current collector foil. Generally, the step of sieving the free graphite anode film from the free current collector foil substantially separates the free graphite anode film and the free collector foil such that the free graphite anode film and the free collector foil are not contacting one another. Typically, the step of sieving the free graphite anode film and the free current collector foil occurs after the step of milling the free graphite anode film and free current collector foil. Additionally, the step of sieving the free graphite anode film and the free current collector foil generally occurs after the step of filtering and drying the free graphite anode film from the second mixture. In some embodiments, the free current collector foil is discarded. In alternative embodiments, the free current collector foil is recycled. In some such embodiments, the recycled free current collector foil is used in the manufacture of new anodes.

The method comprises the step of combining the free graphite anode film with a solvent to form an anode formation slurry. Typically, the solvent comprises N-methyl-2-pyrrolidone (NMP). Generally, the step of combining the free graphite anode film with a solvent occurs after the step of filtering and drying the free graphite anode film from the second mixture. In some such embodiments, step of combining the free graphite anode film with a solvent is the fifth step.

In some embodiments, the method comprises the step of using the anode formation slurry in the manufacture of a new anode. Typically, the anode slurry is formed in a shear mixer after adding the solvent N-methyl-2-pyrrolidone (NMP) to the graphite anode films. The slurry is coated onto the current collector through a slot-die coater to produce a new anode. In some such embodiments, the PVDF binder is the same that adhered the graphite anode film to the current collector foil, wherein the graphite anode film was used to form the anode slurry. In some embodiments, the new current collector foil is made from a recycled current collector foil.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of recycling lithium-ion battery anodes, said method comprising:
   isolating an anode scrap, the anode scrap comprising a graphite anode film adhered to a current collector foil with a polyvinylidene fluoride (PVDF) binder;
   combining deionized water with the anode scrap to form a first mixture;
   delaminating the graphite anode film from the current collector foil to form a second mixture comprising a free collector foil and a free graphite anode film;
   filtering and drying the free graphite anode film from the second mixture to recover the free graphite anode film;
   combining the free graphite anode film with a solvent comprising N-methyl-2-pyrrolidone (NMP) to form an anode formation slurry; and
   wherein combining the deionized water with the anode scrap occurs before delaminating the graphite anode film from the current collector foil.

2. The method of claim 1 wherein the current collector foil comprises copper.

3. The method of claim 1 further comprising the step of using the anode formation slurry in the manufacture of a new anode.

4. The method of claim 1 further comprising the step of shredding the anode scrap into a collection of smaller anode fragments before the step of combining deionized water with the anode fragment to form a first mixture.

5. The method of claim 1 further comprising the step of modulating a temperature of the first mixture.

6. The method of claim 1 further comprising milling the free graphite anode film and free collector foil.

7. The method of claim 1 further comprising sieving the free graphite anode film and free collector foil.

8. The method of claim 1 wherein the first mixture consists of deionized water and the anode scrap.

9. The method of claim 1 wherein the method is performed at a temperature of from 15 to 100 degrees Celsius.

10. The method of claim 1 wherein the method is performed at room temperature.

11. The step of delaminating the graphite anode film from the current collector foil of claim 1, wherein the step occurs in under 30 minutes.

12. The step of delaminating the graphite anode film from the current collector foil of claim 1, wherein the step occurs in under 10 minutes.

* * * * *